(12) United States Patent
Takamoto (10) Patent No.: US 11,726,725 B2
(45) Date of Patent: Aug. 15, 2023

(54) PRINTING DEVICE AND POWER CONTROL METHOD

(71) Applicant: SEIKO EPSON CORPORATION, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/081,461

(22) Filed: Oct. 27, 2020

(65) Prior Publication Data

US 2021/0124534 A1    Apr. 29, 2021

(30) Foreign Application Priority Data

Oct. 28, 2019  (JP) .................................. 2019-195078

(51) Int. Cl.
*G06F 3/12*        (2006.01)
*H04N 1/00*        (2006.01)

(52) U.S. Cl.
CPC ............ *G06F 3/122* (2013.01); *G06F 3/1224* (2013.01); *G06F 3/1229* (2013.01); *H04N 1/00904* (2013.01)

(58) Field of Classification Search
None
See application file for complete search history.

(56) References Cited

U.S. PATENT DOCUMENTS

| 2008/0198402 | A1* | 8/2008 | Azuma | G03G 15/80 |
| | | | | 358/1.15 |
| 2014/0240753 | A1* | 8/2014 | Anno | G06F 3/1206 |
| | | | | 358/1.15 |
| 2015/0146235 | A1* | 5/2015 | Sekine | G06K 15/4055 |
| | | | | 358/1.14 |
| 2016/0210090 | A1 | 7/2016 | Shimizu et al. | |
| 2017/0364022 | A1* | 12/2017 | Hanayama | B41J 29/13 |
| 2020/0150572 | A1* | 5/2020 | Funaba | G03G 15/5004 |
| 2021/0281702 | A1* | 9/2021 | Takamoto | G06F 3/123 |

FOREIGN PATENT DOCUMENTS

| JP | 2007-216619 | 8/2007 |
| JP | 2010-009474 | 1/2010 |
| JP | 2017-052296 | 3/2017 |

\* cited by examiner

*Primary Examiner* — Eric A. Rust
(74) *Attorney, Agent, or Firm* — Workman Nydegger (57) ABSTRACT

A printing device, which is communicable with an external device via a cable and performs printing by using first power supplied from an external power supply, includes a volatile storage section having a volatile storage region, a nonvolatile storage section having a nonvolatile storage region, a printing mechanism that performs the printing, a connector that is coupled to the cable and is used for both communication with the external device and supply of second power from the external device, a communication control section that controls communication with the external device via the cable, and a control section, in which, when the first power is not supplied from the external power supply and when the second power is supplied from the external device via the cable, the communication control section, the control section, the volatile storage section, and the nonvolatile storage section operate using the supplied second power.

14 Claims, 7 Drawing Sheets

PRINTING DEVICE AND POWER CONTROL METHOD

The present application is based on, and claims priority from JP Application Serial Number 2019-195078, filed Oct. 28, 2019, the disclosure of which is hereby incorporated by reference herein in its entirety.

BACKGROUND

1. Technical Field

The present disclosure relates to a printing device and a control method.

2. Related Art

Research and development are conducted on a printing device that prints an image on a printing medium.

In this regard, there is known a printing device that includes a volatile storage device having a volatile storage region and a nonvolatile storage device having a nonvolatile storage region and is coupled to an external storage device and sets setting information in the printing device by storing the setting information stored in an external storage device in the nonvolatile storage device via the volatile storage device (see JP-A-2017-052296).

However, the printing device described in JP-A-2017-052296 operates using power supplied from an external power supply. The external power supply is, for example, an AC adapter or a storage battery. Therefore, a user cannot store setting information in the printing device when the printing device is not coupled to an external power supply. As a result, for example, when the printing device is stored in a storage box, the user has to store setting information in the printing device while taking out the printing device from the storage box, and thus, it may take time and effort.

SUMMARY

According to an aspect of the present disclosure, a printing device, which is communicable with an external device via a cable and performs printing by using first power supplied from an external power supply, includes a volatile storage section having a volatile storage region, a nonvolatile storage section having a nonvolatile storage region, a printing mechanism that performs the printing, a connector that is coupled to the cable and is used for both communication with the external device and supply of second power from the external device, a communication control section that controls communication with the external device via the cable, and a control section, in which, when the first power is not supplied from the external power supply and when the second power is supplied from the external device via the cable, the communication control section, the control section, the volatile storage section, and the nonvolatile storage section operate using the supplied second power.

Further, according to another aspect of the present disclosure, a control method of a printing device that is communicable with an external device via a cable and performs printing by using first power supplied from an external power supply and includes a volatile storage section having a volatile storage region, a nonvolatile storage section having a nonvolatile storage region, a printing mechanism that performs the printing, a connector coupled to a cable used for both communication with the external device and supply of second power from the external device, a communication control section that controls communication with the external device via the cable when the cable is coupled to the connector, and a control section, includes causing the second power to be supplied from the external device via the cable without supplying the first power from the external power supply, and operating the communication control section, the control section, the volatile storage section, and the nonvolatile storage section by using the supplied second power.

DESCRIPTION OF EXEMPLARY EMBODIMENTS

Embodiments

Hereinafter, embodiments of the present disclosure will be described with reference to the drawings.

Overview of Printing Device 10

First, an overview of the printing device 10 according to the embodiment will be described.

The printing device 10 can communicate with an external device. The printing device 10 performs printing by using first power supplied from an external power supply 20. The printing device 10 includes a volatile storage section 102, a nonvolatile storage section 103, a printing mechanism 104, a connector, a communication control section 106, and a control section. The volatile storage section 102 has a volatile storage region. The nonvolatile storage section 103 has a nonvolatile storage region. The printing mechanism 104 performs printing. The connector is coupled to a cable used for both communication with an external device and supply of second power from the external device. When the cable is coupled to the connector, the communication control section 106 controls communication with the external device via the cable. Then, when the first power is not supplied from the external power supply 20 and the second power is supplied from the external device via the cable, at least the communication control section 106, the control section, the volatile storage section 102, and the nonvolatile storage section 103 each operate using the supplied second power. Thereby, the printing device 10 can store setting information by using the second power even when the first power is not supplied from the external power supply 20. Hereinafter, a configuration of the printing device 10 and a process in which the printing device 10 that operates using the second power stores the setting information will be described in detail.

Configuration of Printing Device 10

Hereinafter, the configuration of the printing device 10 will be described as an example of the printing device 10 according to the embodiment.

Figure 1:
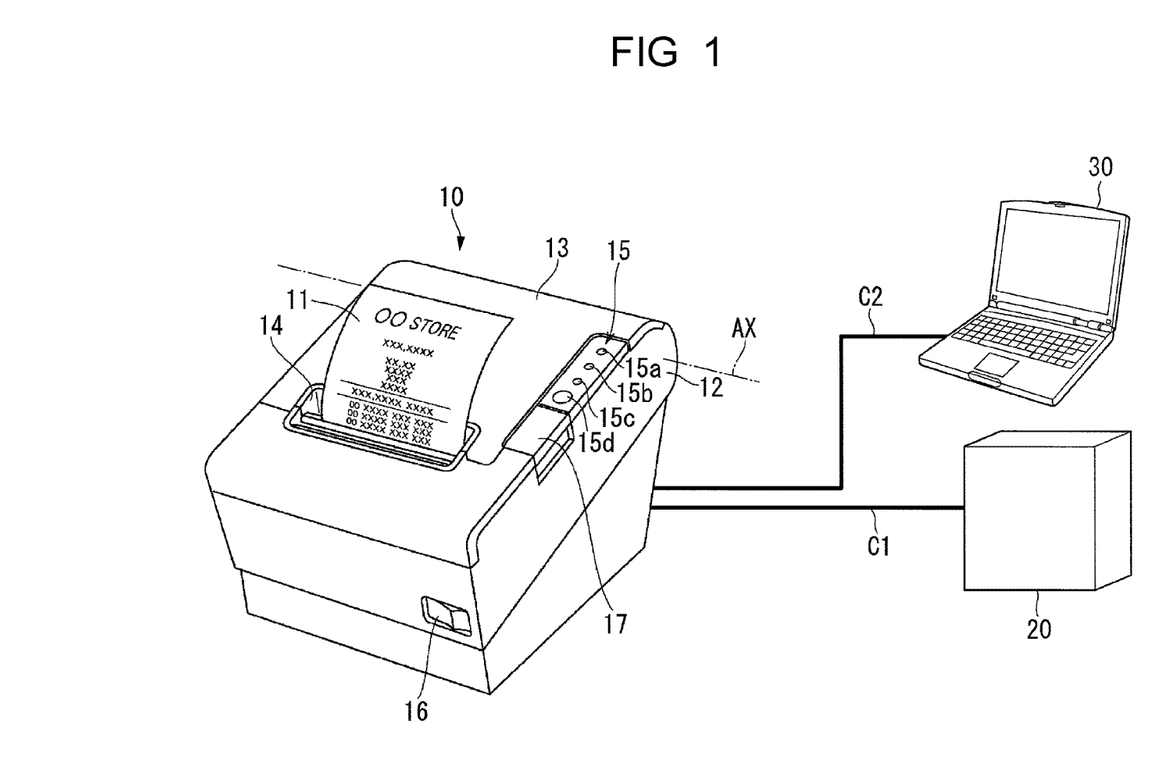
FIG. 1 is a diagram illustrating an example of an appearance of a printing device.

FIG. 1 is a diagram illustrating an example of an appearance of the printing device 10.

The printing device 10 is a thermal printer. The printing device 10 is, for example, a direct thermal printer that thermally records an image with a thermal line head not illustrated in FIG. 1. The printing device 10 may be another thermal printer instead of the direct thermal printer. Further, the printing device 10 may be another type of printer such as a dot impact printer or an ink jet printer, instead of the thermal printer.

The printing device 10 performs printing on a long recording paper 11 pulled out from a roll paper (not illustrated) stored inside the printing device 10.

As illustrated in FIG. 1, the printing device 10 includes a main body case 12 and a cover case 13. In the printing device 10, the main body case 12 and the cover case 13 respectively form an exterior of the printing device 10.

The main body case 12 is a case that can accommodate roll paper, among cases that form the exterior of the printing device 10.

Further, the main body case 12 is provided with a discharge hole 14 for discharging recording paper 11. A cutting mechanism (not illustrated) is disposed inside the discharge hole 14. The cutting mechanism partially or completely separate printed recording paper from unprinted recording paper. The printed recording paper is a recording paper portion of the recording paper 11 that is printed. The unprinted recording paper is a recording paper portion of the recording paper 11 that is not printed.

Further, a display section 15 is provided on the body case 12. The display section 15 includes an LED display section 15a, an LED display section 15b, and an LED display section 15c, each having a light emitting diode (LED) as a light source. The display section 15 displays an operation state and the like of the printing device 10 according to lighting states of the LED display section 15a, the LED display section 15b, and the LED display section 15c. Further, the display section 15 includes a switch 15d that receives an operation of a user.

Further, a power supply switch 16 is provided on the main body case 12. The power supply switch 16 is a power supply switch of the printing device 10.

The cover case 13 is a case that can be opened and closed with respect to the main body case 12 among the cases that form the exterior of the printing device 10. The cover case 13 is coupled to the main body case 12 via a predetermined rotation axis AX. That is, the cover case 13 is rotatable around the rotation axis AX with respect to the main body case 12.

Here, the main body case 12 is provided with an open button 17. When the open button 17 is pushed down, the cover case 13 is opened. When the cover case 13 is opened, an inside of the main body case 12 is opened. When the inside of the main body case 12 is opened, a roll paper accommodation section (not illustrated) inside the main body case 12 is exposed. That is, when the cover case 13 is opened, the printing device 10 is in a state where the inside of the main body case 12 is opened.

Further, when the cover case 13 is closed, the inside of the main body case 12 is closed. When the inside of the cover case 13 is closed, the printing device 10 is in a state where a normal operation can be normally performed.

Further, the main body case 12 is provided with a first connector 18. In FIG. 1, the first connector 18 is located on a rear side of the printing device 10, thus being not visible. The first connector 18 is coupled to a first cable C1 by being plugged in the first cable C1. The first cable C1 is a power supply cable that couples the external power supply 20 to the printing device 10. The external power supply 20 is a power supply device that supplies the first power to the printing device 10. In the example illustrated in FIG. 1, the printing device 10 is coupled to the external power supply 20 via the first cable C1.

Here, the external power supply 20 is, for example, an alternating current (AC) adapter. In this case, the external power supply 20 converts power supplied from a commercial power supply (not illustrated) into the first power and supplies the converted first power to the printing device 10. Here, a voltage of the first power is, for example, 24 volts. The voltage of the first power may be lower than 24 volts or higher than 24 volts. Further, the external power supply 20 may be another power supply device such as a storage battery instead of the AC adapter as long as the power supply device can supply the first power to the printing device 10. Further, in FIG. 1, a power supply cable coupling the commercial power supply to the external power supply 20 is omitted to prevent the drawing from being complicated.

Further, a second connector 19 is provided to the main body case 12. In FIG. 1, the second connector 19 is not visible because of being located on a rear side of the printing device 10. The second connector 19 is coupled to a second cable C2 by being plugged in the second cable C2. The second cable C2 is used for both communication with an external device and supply of the second power from the external device. For example, the second cable C2 is a Universal Serial Bus (USB) cable. In this case, the second connector 19 is a USB connector. If the second cable C2 is used for both communication with an external device 30 and supply of the second power from the external device 30 instead of the USB cable, Lightning (registered trademark), the second cable may be another cable such as a Lightning (registered trademark) cable. The second connector 19 is an example of a connector. Further, the second cable C2 is an example of a cable.

Here, the external device 30 is coupled to the printing device 10 via the second cable C2. Further, the external device 30 is a device different from the printing device 10. The external device 30 may be any device as long as the device can be coupled to the printing device 10 via the second cable C2 and is different from the printing device 10. In the example illustrated in FIG. 1, the printing device 10 is coupled to the external device 30 via the second cable C2. The external device 30 is an example of the external device.

For example, the external device 30 sets setting information to the printing device 10 via the second cable C2. The setting information includes various types of information set in the printing device 10. The setting information includes, for example, printing setting information, communication setting information, firmware information and the like.

The printing setting information includes various types of information set in the printing device 10 regarding printing performed by the printing device 10. The printing setting information includes, for example, some or all of font information, a registered image, printing density information, printing speed information, and the like. The font information indicates a font used by the printing device 10 for printing. The registered image is printed on the recording paper 11 as a background image. For example, the registered image is a shop logo, a mark indicating a confidential document, a tint block image, or the like. The printing density information indicates density of an image printed by the printing device 10 on the recording paper 11. The printing speed information indicates a speed at which the printing device 10 prints an image on the recording paper 11.

The communication setting information is set in the printing device 10 regarding communication with another device via a network. The communication setting information includes, for example, some or all of an Internet Protocol (IP) address, a subnet mask, a gateway, access point information, security information and the like. The access point information indicates an access point that the printing device 10 couples wirelessly, and is, for example, a service set identifier (SSID) or the like. The security information relates to security in communication performed by the printing device 10. The security information includes, for example, some or all of information indicating a wired equivalent privacy (WEP) key and information indicating Wi-Fi protected setup (WPS). Here, Wi-Fi is a registered trademark.

The firmware information relates to firmware installed in the printing device 10. The firmware information includes, for example, some or all of firmware installed in the printing device 10 and information updating the firmware installed in the printing device 10.

Here, the external device 30 causes the printing device 10 to store the setting information. After storing the setting information in the printing device 10, the external device 30 sets the stored setting information in the printing device 10. Specifically, when the setting information includes the printing setting information, the external device 30 causes the printing device 10 to perform a process of designating the storage region storing the printing setting information in the firmware as a reference destination to which the firmware refers to the printing setting information when the printing device 10 performs printing. Further, when the setting information includes the communication setting information, the external device 30 causes the printing device 10 to perform a process of designating a storage region that stores the communication setting information as firmware, as a reference destination for the firmware to refer to the communication setting information when the printing device 10 communicates. Further, when the setting information includes the firmware information, the external device 30 causes the printing device 10 to install the firmware or to update the firmware. Through this process described above, the external device 30 sets the setting information in the printing device 10.

The external device 30 is an information process device, and is, for example, a notebook personal computer (PC), a tablet PC, a multifunctional mobile phone terminal (smartphone), a personal digital assistant (PDA), a desktop PC, a workstation, or the like. The external device 30 may be another type of information process device instead of these.

Hardware Configuration included in Printing Device 10

Figure 2:
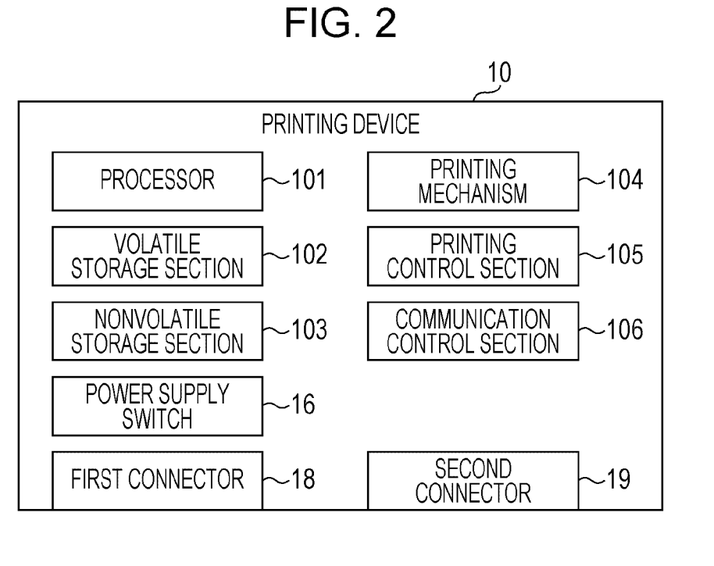
FIG. 2 is a diagram illustrating an example of a hardware configuration included in the printing device.

Hereinafter, a hardware configuration included in the printing device 10 will be described with reference to FIG. 2. FIG. 2 is a diagram illustrating an example of a hardware configuration included in the printing device 10.

As illustrated in FIG. 2, the printing device 10 includes a processor 101, the volatile storage section 102, the nonvolatile storage section 103, the printing mechanism 104, a printing control section 105, and the communication control section 106. Here, for the sake of convenient description, FIG. 2 illustrates the processor 101, the volatile storage section 102, the nonvolatile storage section 103, the printing mechanism 104, the printing control section 105, the communication control section 106, the power supply switch 16, the first connector 18, and the second connector 19. The printing device 10 may be configured to include other hardware function sections in addition to the processor 101, the volatile storage section 102, the nonvolatile storage section 103, the printing mechanism 104, the printing control section 105, and the communication control section 106.

The processor 101 is, for example, a central processing unit (CPU). The processor 101 may be another processor such as field programmable gate array (FPGA). The processor 101 is an example of a control section.

The volatile storage section 102 is a storage device having a volatile storage region. The volatile storage section 102 is, for example, a random access memory (RAM). The volatile storage section 102 may be another storage device as long as the storage device has a volatile storage region.

The nonvolatile storage section 103 is a storage device having a nonvolatile storage region. The nonvolatile storage section 103 is, for example, a flash memory. The nonvolatile storage section 103 may be another storage device as long as the storage device has a nonvolatile storage region.

The printing mechanism 104 includes, for example, a transport roller, a transport motor, a thermal line head, and a cutting mechanism. The transport roller transports the recording paper 11. The transport motor drives various gears and transport rollers. The thermal line head prints an image on the recording paper 11 transported by the transport motor. The cutting mechanism cuts the recording paper 11 after being printed by the thermal line head.

The printing device 10 may be configured to include a cutting mechanism as a mechanism different from the printing mechanism 104. In this case, when power is supplied to the printing mechanism 104, the power is also supplied to the cutting mechanism in the printing device 10. Further, when supply of the power to the printing mechanism 104 is blocked, supply of the power to the cutting mechanism is also blocked in the printing device 10. Further, the power supplied to the printing mechanism 104 is the same as the power supplied to the cutting mechanism in the printing device 10. That is, for example, when the first power is supplied to the printing mechanism 104, the first power is also supplied to the cutting mechanism in the printing device 10. Further, the printing device 10 may be configured to include a transport mechanism having a transport roller and a transport motor as a mechanism different from the printing mechanism 104. In this case, when power is supplied to the printing mechanism 104, the power is also supplied to the transport mechanism in the printing device 10. Further, when supply of the power to the printing mechanism 104 is blocked, supply of the power to the transport mechanism is also blocked in the printing device 10. Further, the power supplied to the printing mechanism 104 is the same as the power supplied to the transport mechanism in the printing device 10. That is, for example, when the first power is supplied to the printing mechanism 104, the first power is also supplied to the transport mechanism in the printing device 10.

The printing control section 105 is a circuit that drives the printing mechanism 104. The printing control section 105 is controlled by the processor 101.

The communication control section 106 is a circuit that controls communication with the external device via the second connector 19. That is, in the example illustrated in FIG. 1, the communication control section 106 controls communication with the external device 30 via the second connector 19. The communication control section 106 is controlled by the processor 101. The communication control section 106 may be configured to include another processor. In this case, among functions of the processor 101, the function of controlling the communication control section 106 may be configured to be included in another processor. In this case, another processor is an example of a control section. Further, the communication control section 106 includes a buffer. The processor 101 can use the buffer instead of the volatile storage section 102 by increasing a storage region of the buffer included in the communication control section 106. In this case, the buffer is an example of a volatile storage section.

State of Printing Device 10 That Changes Depending on Power Supplied to Printing Device 10

States of the printing device 10 are different from each other when the first power is supplied and when the second power is supplied. Therefore, hereinafter, the state of the printing device 10 that changes depending on the power supplied to the printing device 10 will be described. Further, hereinafter, a case in which a voltage of the second power is lower than a voltage of the first power will be described as an example. The voltage of the second power is, for example, 5 volts or 3.3 volts. A mechanism such as the printing mechanism 104 operates by receiving the first power supplied from the external power supply 20. The other logic circuits such as the processor 101, the volatile storage section 102, the nonvolatile storage section 103, the printing control section 105, and the communication control section 106 operate by receiving the second power. When the first power is supplied via the power supply switch 16, the printing device 10 generates the second power from the first power by using a power supply circuit and supplies the generated second power to the respective logic circuits described above. Hereinafter, for the sake of convenient description, two hardware function sections of the printing mechanism 104 and the printing control section 105 will be collectively referred to as a first hardware function section of the printing device 10. Here, the first hardware function section is a hardware function section that the printing device 10 can drive by using the voltage of the first power. The first hardware function section may be a hardware function section that can be driven by using either the voltage of the first power or the voltage of the second power. Further, hereinafter, for the sake of convenient description, four hardware function sections of the processor 101, the volatile storage section 102, the nonvolatile storage section 103, and the communication control section 106 are referred to as a second hardware function section of the printing device 10. Here, the second hardware function section is a hardware function section that the printing device 10 can drive by using either the voltage of the first power or the voltage of the second power.

Figure 3:
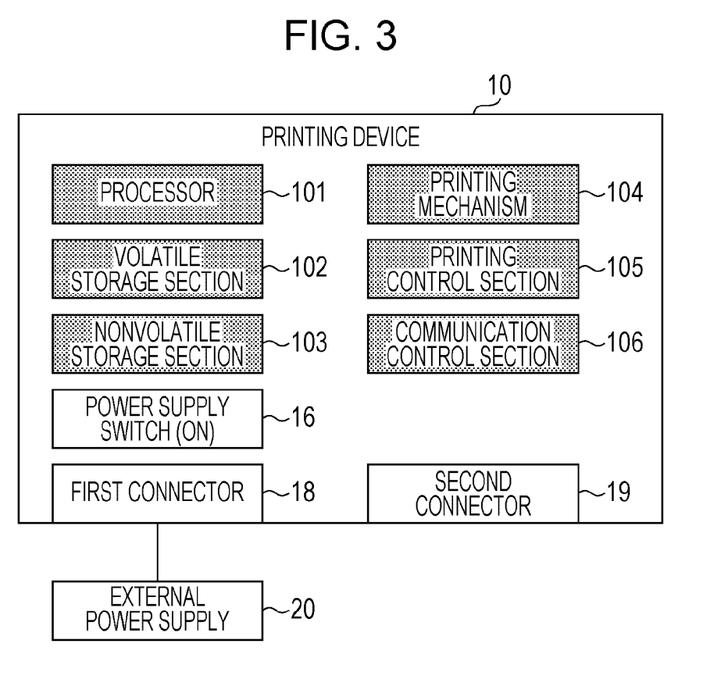
FIG. 3 is a diagram illustrating an example of a state of the printing device when first power is supplied to the printing device.

FIG. 3 is a diagram illustrating an example of a state of the printing device 10 when the first power is supplied to the printing device 10. In the example illustrated in FIG. 3, an external power supply 20 is coupled to the printing device 10. Further, in the example, the external device 30 is not coupled to the printing device 10. In the example, the printing device 10 sets the power supply switch 16 to an ON state. Therefore, the printing device 10 illustrated in FIG. 3 is supplied with the first power from the external power supply 20. In FIG. 3, the ON state in which the power supply switch 16 is ON is denoted by "(ON)".

When the first power is supplied to the printing device 10, the printing device 10 causes each portion of the first hardware function section and each portion of the second hardware function section to operate using the first power. In other words, when the first power is supplied to the printing device 10, power generated based on the first power or the first power is supplied to each portion of the first hardware function section in the printing device 10. Further, when the first power is supplied to the printing device 10, the power generated based on the first power or the first power is also supplied to each portion of the second hardware function section in the printing device 10. That is, the printing device 10 can operate all the hardware function sections included in the printing device 10. As a result, the printing device 10 can perform all the functions that the printing device 10 has. In FIG. 3, among the hardware function sections included in the printing device 10, the hardware function sections that the printing device 10 illustrated in FIG. 3 operates by using the first power are denoted by hatched blocks.

Figure 4:
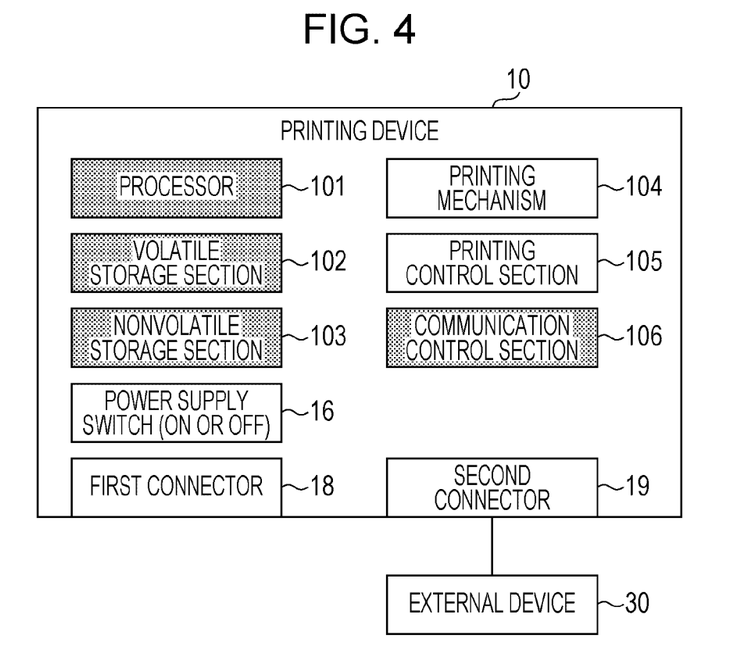
FIG. 4 is a diagram illustrating an example of a state of the printing device when second power is supplied to the printing device.

Meanwhile, FIG. 4 is a diagram illustrating an example of the state of the printing device 10 when the second power is supplied to the printing device 10. In the example illustrated in FIG. 4, the external power supply 20 is not coupled to the printing device 10. The external device 30 is coupled to the printing device 10. In the printing device 10, a state of the power supply switch 16 is an ON state or an OFF state. That is, the state of the printing device 10 illustrated in FIG. 4 does not change depending on the state of the power supply switch 16. In FIG. 4, the ON state or the OFF state of the power supply switch 16 is denoted by "(ON or OFF)".

When the second power is supplied to the printing device 10, the printing device 10 causes each portion of the second hardware function section to operate using the second power. In other words, when the second power is supplied to the printing device 10, power generated based on the second power or the second power is supplied to each portion of the second hardware function section in the printing device 10. That is, when the second power is supplied to the printing device 10, the printing device 10 can operate some hardware function sections included in the printing device 10. As a result, the printing device 10 can perform some functions of the printing device 10. Thereby, the printing device 10 can use power smaller than the first power as the second power supplied from the external device 30. In FIG. 4, among the hardware function sections included in the printing device 10, the hardware function sections that the printing device 10 operates using the second power are denoted by hatched blocks.

Here, when the printing device 10 operates each portion of the second hardware function section, the printing device 10 cannot perform some functions of the printing device 10. However, the printing device 10 can store various types of information in the nonvolatile storage section 103 in response to a request from the external device 30. Further, the printing device 10 can set the setting information stored in the printing device 10 in response to the request from the external device 30. In other words, the printing device 10 can store the setting information by coupling the external device 30 via the second cable C2 without coupling the external power supply 20. The printing device 10 can set the setting information even when the first power is not supplied from the external power supply 20.

When the first hardware function section can also be driven by using either the voltage of the first power or the voltage of the second power, or when the voltage of the second power is higher than or equal to the voltage of the first power, the printing device 10 may be configured to operate each portion of the first hardware function section and each portion of the second hardware function section by using the second power even when the second power is supplied.

Figure 5:
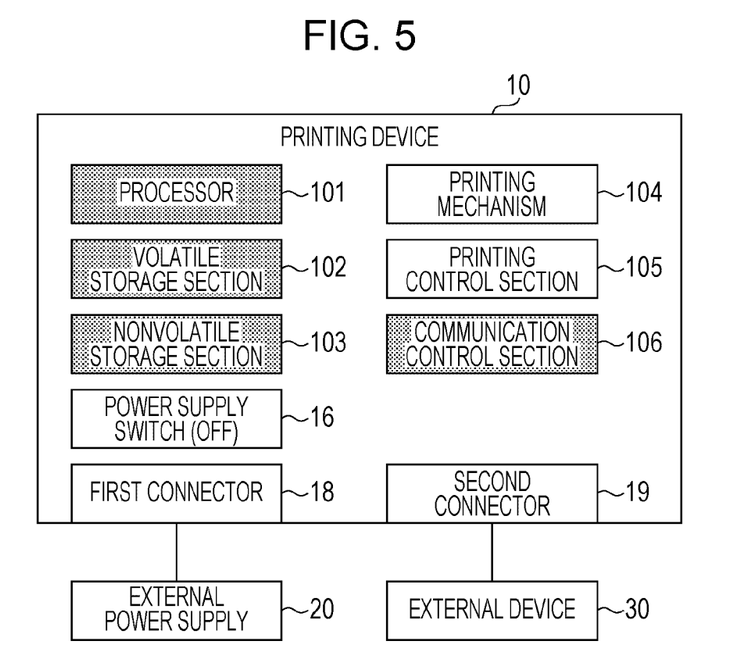
FIG. 5 is a diagram illustrating another example of a state of the printing device when the second power is supplied to the printing device.

Further, even in a case in which the external power supply 20 is coupled to the printing device 10, when a state of the power supply switch 16 is the OFF state and the external device 30 is coupled thereto, the second power is supplied from the external device 30. FIG. 5 is a diagram illustrating another example of the state of the printing device 10 when the second power is supplied to the printing device 10. In the example illustrated in FIG. 5, the external power supply 20 is coupled to the printing device 10. The external device 30 is coupled to the printing device 10. In the printing device 10, a state of the power supply switch 16 is the OFF state. That is, the state of the printing device 10 illustrated in FIG. 5 is the same as the state of the printing device 10 illustrated in FIG. 4 In FIG. 5, the OFF state in which the power supply switch 16 is off is denoted by "(OFF)". Also in FIG. 5, among the hardware function sections included in the printing device 10, the hardware function sections that the printing device 10 operates using the second power are denoted by hatched blocks.

Figure 6:
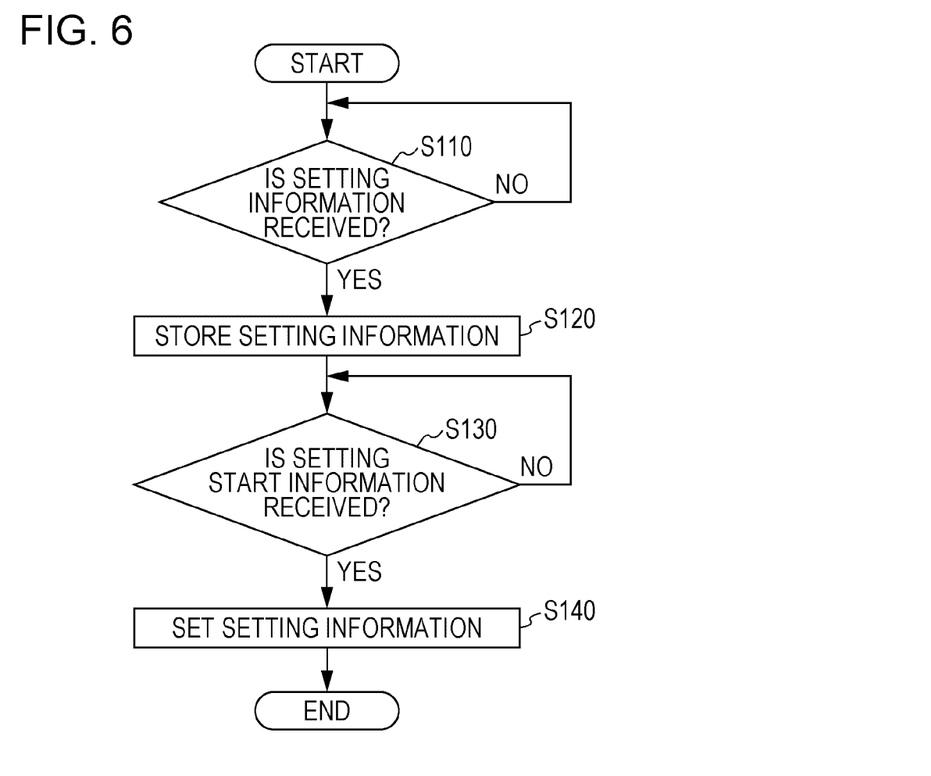
FIG. 6 is a diagram illustrating an example of a flow of a process in which the printing device that operates by using the second power stores setting information.

Process in Which Printing Device 10 That Operates Using Second Power Stores Setting Information Hereinafter, a process in which the printing device 10 that operates using the second power stores setting information will be described with reference to FIG. 6. FIG. 6 is a diagram illustrating an example of a flow of a process in which the printing device 10 that operates using the second power stores the setting information. Hereinafter, a case will be described in which the printing device 10 and the external device 30 are coupled to each other via the second cable C2 at a timing before a process of step S110 illustrated in FIG. 6 is performed. Further, a case in which the external power supply 20 is not coupled to the printing device 10 will be described hereinafter.

The processor 101 stands by until the communication control section 106 receives the setting information from the external device 30 (step S110).

When it is determined that the communication control section 106 receives the setting information from the external device 30 (step S110-YES), the processor 101 stores the setting information received by the communication control section 106 in the volatile storage section 102. Then, the processor 101 stores the setting information stored in the volatile storage section 102 in the nonvolatile storage section 103 (step S120). That is, the processor 101 stores the setting information received by the communication control section 106 in the nonvolatile storage section 103. At this time, when the previously stored setting information is stored in the nonvolatile storage section 103, the processor 101 deletes the previously stored setting information and stores new setting information in the nonvolatile storage section 103. When receiving the setting information from the external device 30, the communication control section 106 temporarily stores the received setting information in a buffer (not illustrated) included in the communication control section 106. When it is determined that the communication control section 106 receives the setting information from the external device 30, the processor 101 reads the setting information from the buffer and stores the read setting information in the volatile storage section 102.

Next, the processor 101 stands by until the communication control section 106 receives setting start information from the external device 30 (step S130).

When it is determined that the communication control section 106 receives the setting start information from the external device 30 (step S130-YES), the processor 101 reads the setting information stored in the nonvolatile storage section 103 from the nonvolatile storage section 103 in step S120. Then, the processor 101 sets the read setting information (step S140) and ends the process.

As described above, the printing device 10 can receive the setting information from the external device 30 by using the second power even when the first power is not supplied. As a result, the printing device 10 can store the received setting information even in this case. Then, the printing device 10 can set the setting information even when the first power is not supplied.

The printing device 10 described above may be configured to receive the setting information and the setting start information from the external device 30 in step S110. In this case, the printing device 10 omits the process of step S130.

Further, the printing device 10 described above may be configured not to perform the processes of step S130 and step S140 when the second power is supplied. That is, the printing device 10 can store the setting information in response to a request from the external device 30 when the second power is supplied, but may be configured not to set the setting information in response to the request from the external device 30. In this case, the printing device 10 sets the setting information by performing a process of the flowchart illustrated in FIG. 7, for example, when the first power is supplied next. Next, a case and the like in which the printing device 10 is activated next by using the first power may be used as a specific example of a case in which the first power is supplied.

Figure 7:
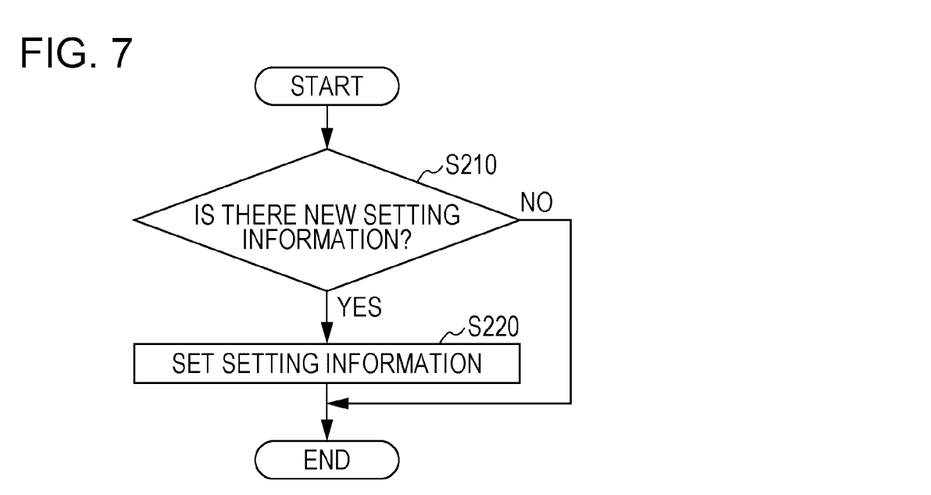
FIG. 7 is a diagram illustrating an example of a flow of a process in which the printing device sets the setting information when the first power is supplied.

FIG. 7 is a diagram illustrating an example of a flow of a process in which the printing device 10 sets the setting information when the first power is supplied. A case in which the process of step S120 illustrated in FIG. 6 is performed at a timing before a process of step S210 illustrated in FIG. 7 is performed will be described. That is, a case in which new setting information not yet set in the printing device 10 is previously stored in the nonvolatile storage section 103 at the timing will be described. Further, a case in which the external power supply 20 is coupled to the printing device 10 and the external device 30 is not coupled to the printing device 10 will be described. Further, a case in which a state of the power supply switch 16 is switched from the OFF state to the ON state at the timing will be described.

The processor 101 determines whether or not new setting information that not yet set in the printing device 10 is stored in the nonvolatile storage section 103 with reference to the nonvolatile storage section 103 (step S210). FIG. 7 illustrates the process of step S210 denoted by "is there new setting information?".

When the processor 101 determines that the new setting information is not stored in the nonvolatile storage section 103 (step S210-NO), the process ends. Then, the processor 101 shifts the state of the printing device 10 to a state of a normal use.

Meanwhile, when it is determined that the new setting information is stored in the nonvolatile storage section 103 (step S210-YES), the processor 101 sets the new setting information stored in the nonvolatile storage section 103

(step S220), and the process ends. After the process of step S220 is performed, the processor 101 may restart the printing device 10 or may not restart the printing device 10.

As described above, even when the printing device 10 is configured not to perform the processes of step S130 and step S140 when the second power is supplied, the printing device 10 can set the setting information when the first power is supplied next.

Process in Which Printing Device 10 Performs Printing in Response to Request from External Device 30

Figure 8:
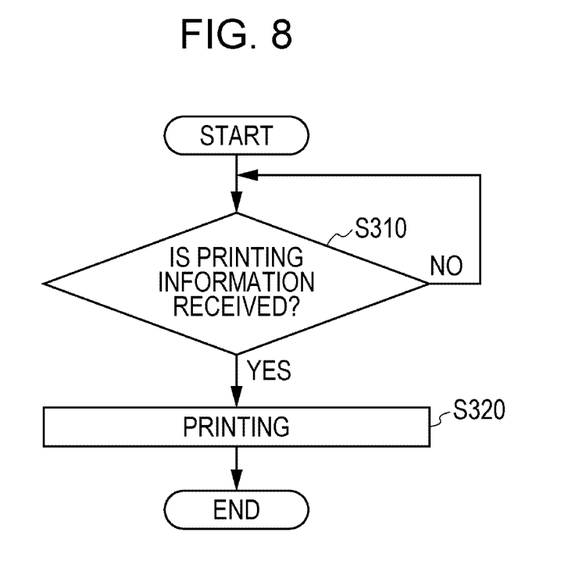
FIG. 8 is a diagram illustrating an example of a flow of a process in which the printing device performs printing in response to a request from an external device.

Hereinafter, a process in which the printing device 10 performs printing in response to a request from the external device 30 will be described with reference to FIG. 8. FIG. 8 is a diagram illustrating an example of a flow of the process in which the printing device 10 performs printing in response to the request from the external device 30. A case in which setting of the setting information in the printing device 10 is completed at a timing before a process of step S310 illustrated in FIG. 8 is performed will be described. Further, a case in which the external power supply 20 is coupled to the printing device 10 and the external device 30 is coupled to the printing device 10 will be described below. Further, a case in which a state of the power supply switch 16 of the printing device 10 is the ON state will be described.

The processor 101 stands by until the communication control section 106 receives printing information from the external device 30 (step S310). Here, the printing information includes an image to be printed by the printing device 10 and information to cause the printing device 10 to start printing.

When it is determined that the communication control section 106 receives printing information from the external device 30 (step S310-YES), the processor 101 causes the printing mechanism 104 to perform printing on the recording paper 11 based on the received printing information (step S320), and the process ends. Printing on the recording paper 11 based on the printing information is printing of an image included in the printing information on the recording paper 11. Here, in step S320, the processor 101 performs printing based on the printing setting information among various types of setting information set in the printing device 10.

Method of Storing Setting Information in Printing Device 10 Packed in Storage Box BX at Time of Shipment Hereinafter, a method of storing the setting information in the printing device 10 that is packed in the storage box BX at the time of shipment will be described. As described above, the printing device 10 can store setting information without coupling the external power supply 20 by coupling the external device 30 via the second cable C2. That is, it is illustrated that the setting information can be stored in the printing device 10 without taking out the printing device 10 packed in the storage box BX from the storage box BX at the time of shipment.

Figure 9:
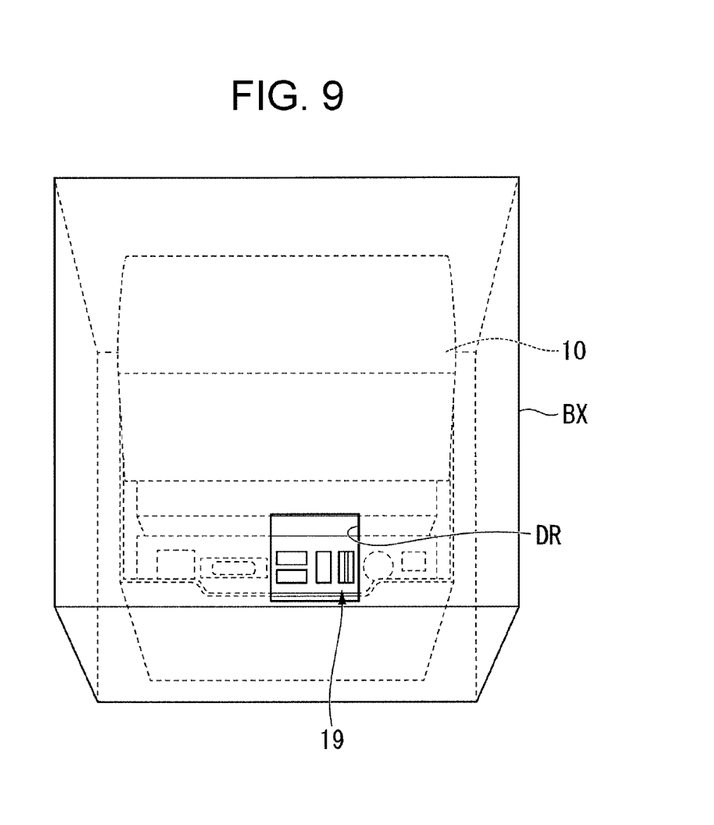
FIG. 9 is a diagram illustrating an example of the printing device packed in a storage box.

FIG. 9 is a diagram illustrating an example of the printing device 10 packed in the storage box BX. The storage box BX illustrated in FIG. 9 is an example of a storage box for packing the printing device 10. That is, in the example illustrated in FIG. 9, the printing device 10 is packed in the storage box BX. The storage box BX is, for example, a corrugated cardboard box. A window section DR that can be opened and closed is formed in the storage box BX. The storage box BX may be made of another material instead of a corrugated cardboard. The window section DR may have any configuration as long as a surface having the window section DR provided therein among surfaces included in the storage box BX can be opened and closed by a hand of a user. Here, as illustrated in FIG. 9, when the printing device 10 is packed in the storage box BX, the second connector 19 of the printing device 10 is in a position that is visible when the window section DR is opened. In other words, the window section DR is formed in the storage box BX such that the second connector 19 is in a position that is visible when the window section DR is opened in a case in which the printing device 10 is packed in the storage box BX. In this case, a person who sets setting information in the printing device 10 by using the external device 30 can couple the second cable C2 to the second connector 19 by opening the window section DR without taking out the printing device 10 from the storage box BX. As a result, the person who sets the setting information can couple the printing device 10 to the external device 30 via the second cable C2. That is, the person who sets the setting information can store the setting information in the printing device 10 by using the external device 30 without taking out the printing device 10 packed in the storage box BX from the storage box BX at the time of shipment. The person who sets the setting information can set the setting information in the printing device 10 by using the external device 30 without taking out the printing device 10 packed in the storage box BX from the storage box BX at the time of shipment. The person who sets the setting information is, for example, a system integrator but is not limited thereto. The window section DR is an example of an opening/closing section.

Figure 10:
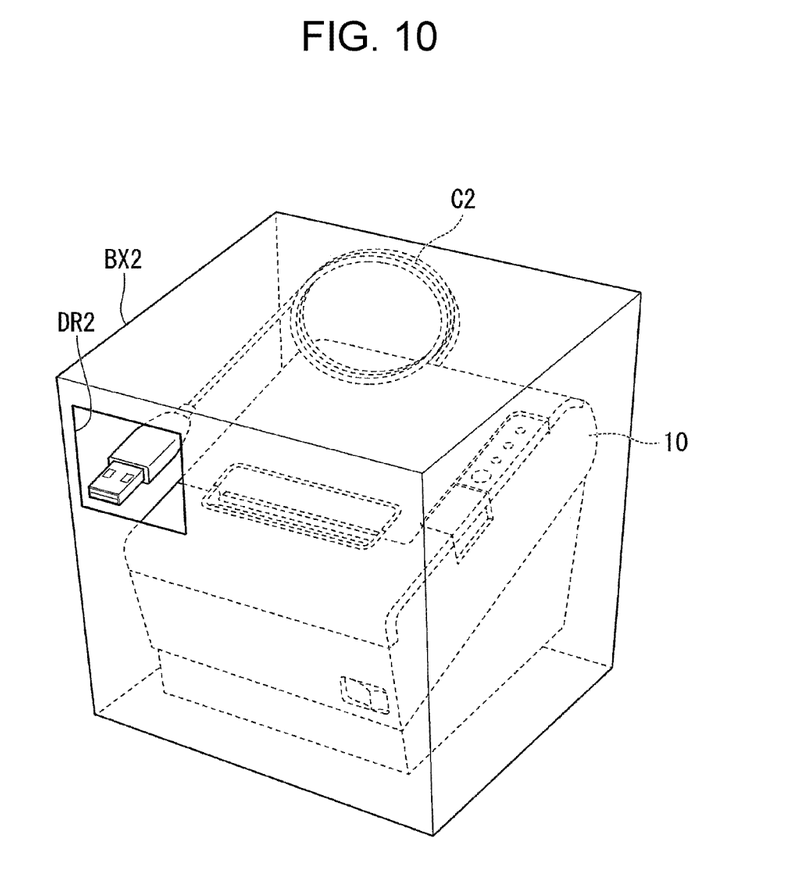
FIG. 10 is a diagram illustrating another example of the printing device packed in the storage box.

FIG. 10 is a diagram illustrating another example of the printing device 10 packed in a storage box BX2. The storage box BX2 illustrated in FIG. 10 is another example of a storage box for packing the printing device 10. That is, in the example illustrated in FIG. 10, the printing device 10 is packed in the storage box BX2 together with the second cable C2 coupled to the second connector 19. The storage box BX2 is, for example, a corrugated cardboard box. A window section DR2 that can be opened and closed is formed in the storage box BX2. The storage box BX2 may be made of another material instead of a corrugated cardboard. The window section DR2 may have any configuration as long as a surface having the window section DR2 provided therein among surfaces included in the storage box BX2 can be opened and closed by a hand of a user. Here, as illustrated in FIG. 10, when the printing device 10 is packed in the storage box BX2, the second cable C2 coupled to the second connector 19 is in a position that is visible when the window section DR2 is opened. In other words, the window section DR2 is formed in the storage box BX2 such that the second cable C2 coupled to the second connector 19 is in a position that is visible when the window section DR2 is opened in a case in which the printing device 10 is packed in the storage box BX2. In this case, a person who sets setting information in the printing device 10 by using the external device 30 can pull out the second cable C2 by opening the window section DR2 without taking out the printing device 10 from the storage box BX2. Then, the person who sets the setting information can couple the pulled-out second cable C2 to the external device 30. As a result, the person who sets the setting information can couple the printing device 10 to the external device 30 via the second cable C2. That is, the person who sets the setting information can store the setting information in the printing device 10 by using the external device 30 without taking out the printing device 10 packed in the storage box BX2 from the storage box BX2 at the time of shipment. Then, the person who sets the setting information can set the setting information in the printing device 10 by using the external device 30 without taking out the printing device 10 packed in the storage box BX2 from the storage box BX2 at the time of shipment. The person who sets the setting information is, for example, a system integrator but is not limited thereto. The window section DR2 is an example of an opening/closing section.

Figure 11:
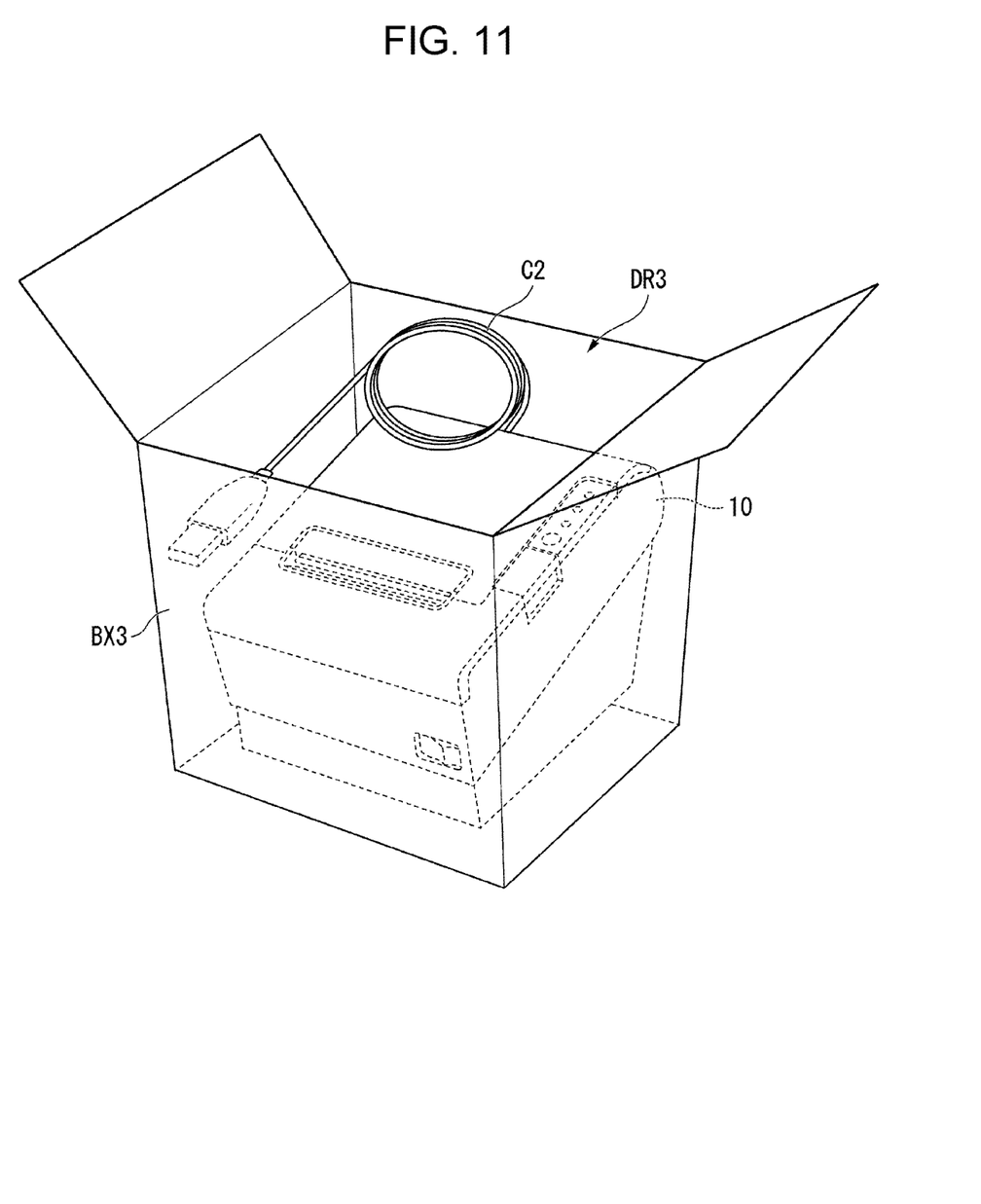
FIG. 11 is a diagram illustrating yet another example of the printing device packed in the storage box.

FIG. 11 is a diagram illustrating yet another example of the printing device 10 packed in a storage box BX3. The storage box BX3 illustrated in FIG. 11 is another example of a storage box for packing the printing device 10. That is, in the example illustrated in FIG. 11, the printing device 10 is packed in the storage box BX3 together with the second cable C2 coupled to the second connector 19. The storage box BX3 is, for example, a corrugated cardboard box. An opening/closing section DR3 that can be opened and closed is formed in the storage box BX3. The storage box BX3 may be made of another material instead of a corrugated cardboard. The opening/closing section DR3 is, for example, a lid that configures one of the surfaces included in the storage box BX3 and can be opened and closed. Here, as illustrated in FIG. 11, when the printing device 10 is packed in the storage box BX3, the second cable C2 coupled to the second connector 19 is in a position that is visible when the opening/closing section DR3 is opened. In other words, the opening/closing section DR3 is formed in the storage box BX3 such that the second cable C2 coupled to the second connector 19 is in a position that is visible when the opening/closing section DR3 is opened in a case in which the printing device 10 is packed in the storage box BX3. In this case, a person who sets setting information in the printing device 10 by using the external device 30 can pull out the second cable C2 by opening the opening/closing section DR3 without taking out the printing device 10 from the storage box BX3. Then, the person who sets the setting information can couple the pulled-out second cable C2 to the external device 30. As a result, the person who sets the setting information can couple the printing device 10 to the external device 30 via the second cable C2. That is, the person who sets the setting information can store the setting information in the printing device 10 by using the external device 30 without taking out the printing device 10 packed in the storage box BX3 from the storage box BX3 at the time of shipment. Then, the person who sets the setting information can set the setting information in the printing device 10 by using the external device 30 without taking out the printing device 10 packed in the storage box BX3 from the storage box BX3 at the time of shipment. The person who sets the setting information is, for example, a system integrator but is not limited thereto. The window section DR2 is an example of an opening/closing section.

As described above, a printing device, which is communicable with an external device via a cable and performs printing by using first power supplied from an external power supply, includes a volatile storage section having a volatile storage region, a nonvolatile storage section having a nonvolatile storage region, a printing mechanism that performs the printing, a connector that is coupled to the cable and is used for both communication with the external device and supply of second power from the external device, a communication control section that controls communication with the external device via the cable, and a control section, in which, when the first power is not supplied from the external power supply and when the second power is supplied from the external device via the cable, the communication control section, the control section, the volatile storage section, and the nonvolatile storage section operate using the supplied second power. Accordingly, the printing device can store setting information by using the second power even when the first power is not supplied from an external power supply.

Further, in the printing device, a configuration may be used in which the communication control section, the control section, the volatile storage section, and the nonvolatile storage section operate using the second power, and thereafter, when the communication control section receives setting information from the external device, the control section stores the received setting information in the nonvolatile storage section. Accordingly, a printing device can store setting information received from an external device even when the first power is not supplied from an external power supply.

Further, in the printing device, a configuration may be used in which the setting information includes update information for updating firmware of the printing device, and the control section reads the setting information from the nonvolatile storage section when the setting information is stored in the nonvolatile storage section and is activated by the first power from the external power supply and updates the firmware of the printing device based on the read setting information. Accordingly, a printing device can update firmware of the printing device without taking out the printing device from, for example, a storage box.

Further, in the printing device, a configuration may be used in which the control section does not supply the supplied second power to the printing mechanism when the first power is not supplied from the external power supply and when the second power is supplied from the external device via the cable. Accordingly, a printing device can use power less than the first power as the second power.

Further, in the printing device, a configuration may be used in which the communication control section, the control section, the volatile storage section, the nonvolatile storage section, and the printing mechanism operates using the supplied first power or power based on the first power when the first power is supplied from the external power supply.

Further, in the printing device, a configuration may be used in which, in a case in which the first power is supplied from the external power supply, when the communication control section receives printing information for causing the printing mechanism to perform the printing from the external device, the control section cause the printing mechanism to perform the printing based on the received printing information.

Further, in the printing device, a configuration may be used in which the printing device is packed in a storage box having an opening/closing section at a time of shipment, and the connector is in a position that is visible from an outside of the storage box when the opening/closing section is opened in a case in which the printing device is stored in the storage box. Accordingly, a printing device can store setting information without taking out the printing device from a storage box even when the printing device is packed in the storage box at the time of shipment.

As described above, although the embodiments are described in detail with reference to the drawings, the specific configuration is not limited to the embodiments, and a change, replacement, removal, and the like may be made without departing from the gist.

Further, a program for realizing a function of any configuration section in the device described above may be recorded in a computer-readable recording medium, and the program may be read and executed by a computer system. Here, the device is, for example, the printing device 10, the external device 30, or the like. It is assumed that the "computer system" mentioned here includes an operating system (OS) and hardware such as a peripheral device. Further, the "computer-readable recording medium" refers to a portable medium such as a flexible disk, a magneto-optical disk, a ROM, or a compact disk (CD)-ROM, or a storage device such as a hard disk built in a computer system. Furthermore, it is assumed that a "computer-readable recording medium" also includes a member which holds a program for a certain period of time, such as a volatile memory inside a computer system that serves as a server or client when a program is transmitted via a network such as the Internet or a communication line such as a telephone line.

Further, the program may be transmitted from a computer system storing the program in a storage device or the like to another computer system via a transmission medium or by a transmission wave in the transmission medium. Here, the "transmission medium" that transmits the program means a medium having a function of transmitting information, for example, a network such as the Internet or a communication line such as a telephone line.

Further, the program may be a program for realizing some of the functions described above. Furthermore, the program may be a program that can realize the functions described above in combination with a program previously recorded in the computer system, that is, a so-called differential file or differential program.

What is claimed is:

1. A printing device that is communicable with an external device via a cable and performs printing by using first power supplied from an external power supply, the printing device comprising:
    a power supply switch via which the first power is supplied;
    a first hardware function section including a printing mechanism that performs the printing;
    a connector that is coupled to the cable and is used for both communication with the external device and supply of second power from the external device; and
    a second hardware function section including a communication control section that controls communication with the external device via the cable, wherein
    when the external power supply is connected and the power supply switch is in an off state, the first power is not provided at all from the external power supply,
    when the external power supply is connected and the power supply switch is in an on state, the first power is provided from the external power supply,
    when the external power supply is not connected, the external device is connected via the cable, and the power supply switch is in the off state, the second hardware function section operates by using the second power,
    when the external power supply is not connected, the external device is connected via the cable, and the power supply switch is in the on state, the second hardware function section operates by using the second power, and
    when both the external power supply and the external device are connected and the power supply switch is in the off state, the first hardware function section does not operate by using the first power, but the second hardware function section operates by using only the second power.

2. The printing device according to claim 1, wherein, when the second function section operates by using the second power and the communication control section receives setting information from the external device, the received setting information is stored in a nonvolatile storage section.

3. The printing device according to claim 2, wherein the setting information includes update information for updating firmware of the printing device,
    the setting information is road from the nonvolatile storage section when the setting information is stored in the nonvolatile storage section and the printing device is activated by the first power from the external power supply, and
    the firmware of the printing device is updated based on the read setting information.

4. The printing device according to claim 2, wherein the second power is not supplied to the printing mechanism when the first power is not supplied from the external power supply and the second power is supplied from the external device via the cable.

5. The printing device according to claim 1, wherein both the first hardware function section and the second hardware function section operate by using the supplied first power or power based on the first power when the first power is supplied from the external power supply and the power supply switch is in the on state.

6. The printing device according to claim 5, wherein, in a case in which the first power is supplied from the external power supply, when the communication control section receives printing information for causing the printing mechanism to perform the printing from the external device, the printing mechanism performs the printing based on the received printing information.

7. The printing device according to claim 1, wherein the printing device is packed in a storage box having an opening/closing section at a time of shipment, and
    the connector is in a position that is visible from an outside of the storage box when the opening/closing section is opened in a case in which the printing device is stored in the storage box.

8. A control method of a printing device that is communicable with an external device via a cable and performs printing by using first power supplied from an external power supply and includes a power supply switch via which the first power is supplied, a first hardware function section including a printing mechanism that performs the printing, a connector coupled to a cable used for both communication with the external device and supply of second power from the external device, and a second hardware function section including a communication control section that controls communication with the external device via the cable, the control method comprising:
    causing the first power not to be provided at all from the external power supply when the external power supply is connected and the power supply switch is in an off state; and
    causing the first power to be provided from the external supply to the printing device when the external power supply is connected and the power supply switch is in an on state, wherein
    the second hardware function section operates by using the second power when the external power supply is not connected, the external device is connected via the cable, and the power supply switch is in the off state,
    the second hardware function section operates by using the second power when the external power supply is not connected, the external device is connected via the cable, and the power supply switch is in the on state, and the second hardware function section operates by using only the second power when both the external power supply, the external device are connected, and the power supply switch is in the off state.

9. The control method according to claim 8, wherein, when the second function section operates by using the second power and the communication control section receives setting information from the external device, the received setting information is stored in a nonvolatile storage section.

10. The control method according to claim 9, wherein the setting information includes update information for updating firmware of the printing device, the setting information is read from the nonvolatile storage section when the setting information is stored in the nonvolatile storage section and the printing device is activated by the first power from the external power supply, and the firmware of the printing device is updated based on the read setting information.

11. The control method according to claim 9, wherein the second power is not supplied to the printing mechanism when the first power is not supplied from the external power supply and the second power is supplied from the external device via the cable.

12. The control method according to claim 8, wherein both the first hardware function section and the second hardware function section operate by using the supplied first power or power based on the first power when the first power is supplied from the external power supply and the power supply switch is in the on state.

13. The control method according to claim 12, wherein, in a case in which the first power is supplied from the external power supply, when the communication control section receives printing information for causing the printing mechanism to perform the printing from the external device, the printing mechanism performs the printing based on the received printing information.

14. The control method according to claim 8, wherein the printing device is packed in a storage box having an opening/closing section at a time of shipment, and in a case in which the printing device is stored in the storage box and the connector is in a position that is visible from an outside of the storage box when the opening/closing section is opened, the connector is coupled to the external device via the cable and the second hardware function section -operates by using the supplied second power.

* * * * *